United States Patent [19]

Pfeiffenberger et al.

[11] Patent Number: 5,048,398

[45] Date of Patent: Sep. 17, 1991

[54] SINGLE, LIGHT-WEIGHT AND LOW FRICTION LIGHT-METAL PISTON FOR INTERNAL-COMBUSTION ENGINES

[75] Inventors: Horst Pfeiffenberger, Fellbach; Emil Ripberger, Remseck; Jürgen Ellermann, Winnenden, all of Fed. Rep. of Germany

[73] Assignee: Mahle GmbH, Stuttgart, Fed. Rep. of Germany

[21] Appl. No.: 368,298

[22] PCT Filed: Dec. 16, 1987

[86] PCT No.: PCT/DE87/00593

§ 371 Date: Jun. 7, 1989

§ 102(e) Date: Jun. 7, 1989

[87] PCT Pub. No.: WO88/04724

PCT Pub. Date: Jun. 30, 1988

[30] Foreign Application Priority Data

Dec. 23, 1986 [DE] Fed. Rep. of Germany ....... 3644188

[51] Int. Cl.[5] ................................................ F16J 1/04

[52] U.S. Cl. ...................................... 92/225; 92/227; 92/228; 92/229; 92/233; 92/234; 92/208; 123/193 P

[58] Field of Search ................ 92/208, 225, 226, 227, 92/228, 229, 233, 234, 177; 123/193 P

[56] References Cited

U.S. PATENT DOCUMENTS

| | | | |
|---|---|---|---|
| 3,917,133 | 11/1975 | Sakakibara . | |
| 4,669,366 | 2/1987 | Ellermann et al. | 92/225 |
| 4,785,774 | 11/1988 | Tokoro | 123/193 P |
| 4,831,919 | 5/1989 | Bruni | 123/193 P |
| 4,864,986 | 9/1989 | Bethel et al. | 123/193 P |

FOREIGN PATENT DOCUMENTS

| | | | |
|---|---|---|---|
| 0171568 | 2/1986 | European Pat. Off. . | |
| 1078387 | 3/1960 | Fed. Rep. of Germany . | |
| 3446121 | 1/1985 | Fed. Rep. of Germany . | |
| 3430258 | 2/1986 | Fed. Rep. of Germany . | |
| 608142 | 9/1948 | United Kingdom | 92/225 |
| 1064080 | 4/1967 | United Kingdom . | |
| 1154136 | 6/1969 | United Kingdom | 92/225 |

OTHER PUBLICATIONS

International Search Report of Mar. 22, 1988.

*Primary Examiner*—Edward K. Look
*Assistant Examiner*—Thomas Denion
*Attorney, Agent, or Firm*—Collard, Roe & Galgano

[57] ABSTRACT

The technical problem is to reduce the operating noise of such a piston. It is solved by means of a piston having the following dimensions: a) A=(0.45-0.65) D; b) H=(0.25-0.4) D; c) A=(0.3-0.4) D; d) A greater than or equal to B; e) T=(0.45-0.8) D; f) the piston ribs between the annular grooves (2, 3, 4) and the rod region with a very narrow operating clearance have, in the case of a hot operating piston, approximately the same clearance in relation to the cylinder operating path. An additional improvement consists in inserting an annular jacket in the piston head in the radial region behind the annular grooves, said jacket consisting of a material having a thermal expension factor less than that of the basic piston material. In a hot operating internal combustion engine, the piston has, in the region of the ribs, a clearance which, in the direction pressure/counter-pressure reaches approximately only 3-5 times the clearance in the very narrow clearance region of the piston rod.

21 Claims, 6 Drawing Sheets

Fig. 1
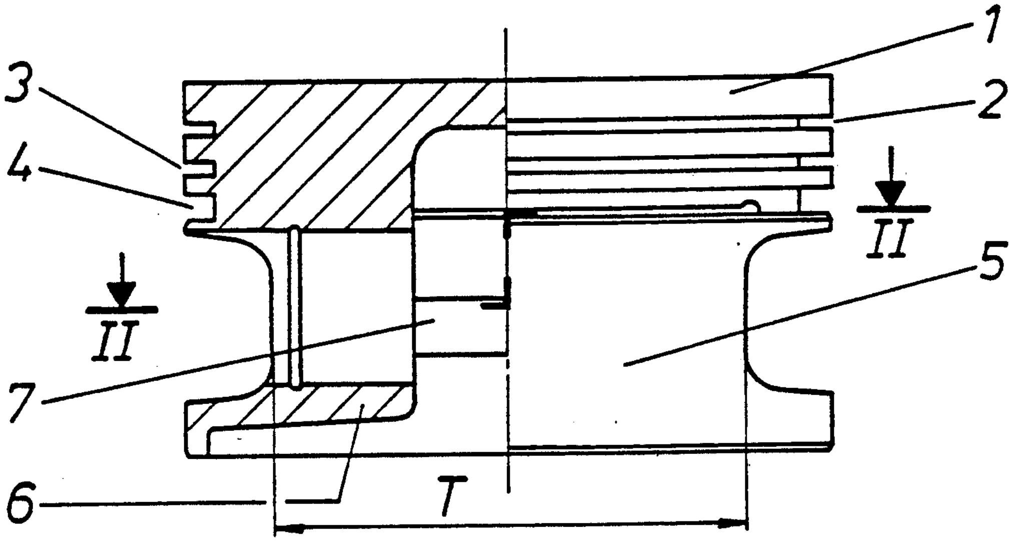
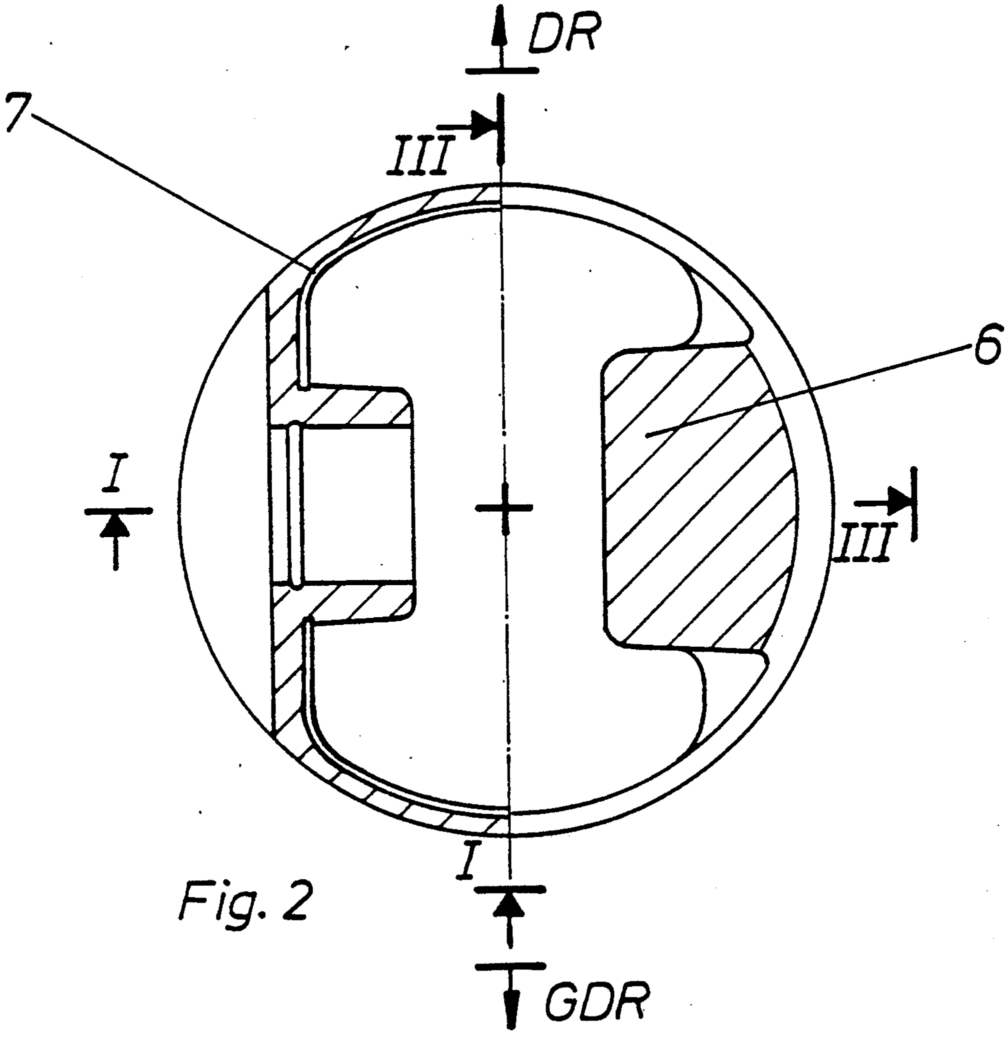
Fig. 2

Fig. 5a Fig. 5b
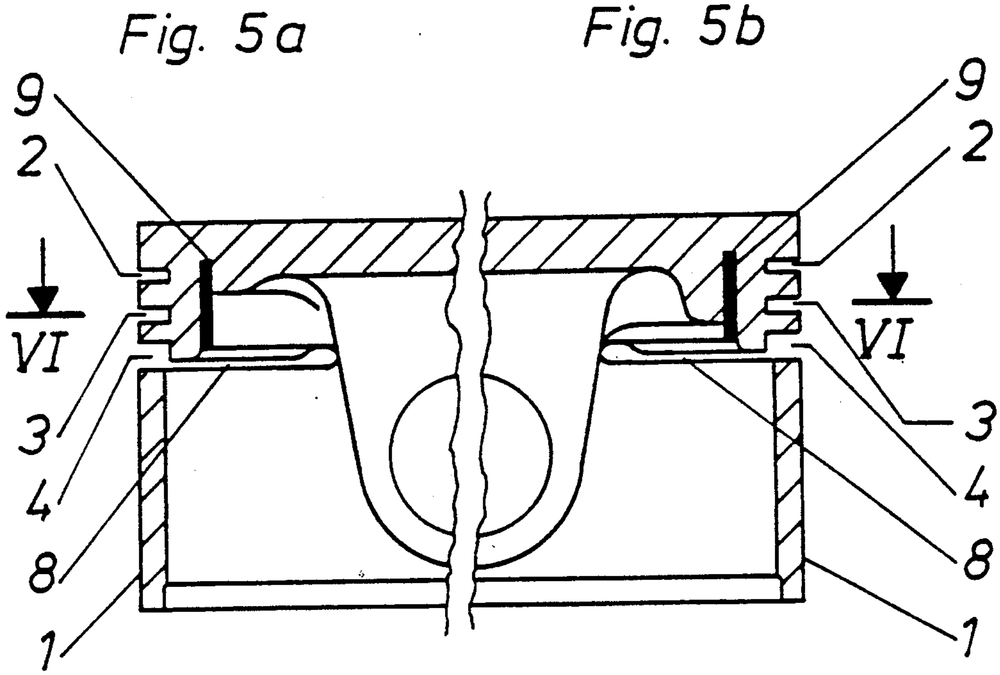
Fig. 6a
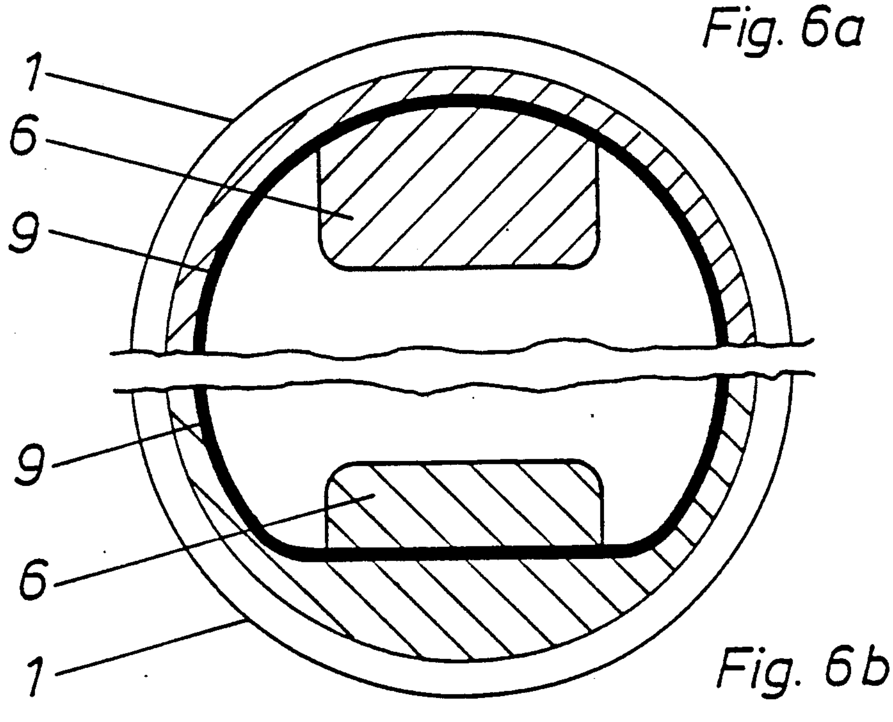
Fig. 6b

SINGLE, LIGHT-WEIGHT AND LOW FRICTION LIGHT-METAL PISTON FOR INTERNAL-COMBUSTION ENGINES

BACKGROUND OF THE INVENTION

1. Field of the Invention

The invention relates to a light-metal low friction piston in a cylinder of an internal combustion engine.

2. The Prior Art

Designs for light-weight and low friction pistons are known in the prior art, e.g., from DE 3,430,258 A1, DE 3,446,121 A1 and EP 0,171,568 A3. With these pistons, as a rule, their noise level is unsatisfactory, due to the extremely short body lengths of the pistons disclosed in these patents and in EP 0,171,568 A3. The piston cannot be guided accurately in such a way that a piston impact, together with a striking of the piston head against the cylinder track, can be reliably avoided under all operating conditions. Striking or impact of the piston head against the cylinder track leads in turn to undesired high levels of piston movement noises. This is especially for engine operation in the start-up and partial load state in which piston body play, because of the low body temperatures occurring at these operating states, has not yet reached its lower value during engine load operation. The lower value during load operation results from the heat-dependent expansion of the body material, whereby expansion in the pressure-counter-pressure direction of the piston can be further reduced by means of expansion-regulating strips.

From DE-AS 1,078,387, a method is already known in the prior art for creating, aside from on the piston body, also on the straps between the piston ring grooves located in the piston head area, a tight play vis-a-vis the cylinder track surface. Those pistons are primarily designed for port-controlled, two-stroke engines, in which a tight operating tolerance at the ring groove straps is required for exact control of the gas scavenging port in the cylinder track. With the relatively long pistons described exclusively in that publication, a tight operating tolerance in the piston head area results in the fact that the operating tolerance cannot be simultaneously extremely narrow in the body area as well. For, practically speaking, such precise fabrication is not possible over a great length of the piston, such that a continuously extremely tight running play over the entire height of a long piston would statically overdefine the latter within the engine cylinder. This would result in the piston's being unable to move. A partial asymmetrical, radial expansion of the piston over its height must also be taken into consideration in such cases, which expansion can also cause a locking within the engine cylinder for long pistons. The former piston known in the prior art, even with considerable modifications of its indicated dimensions, is therefore in no way suited to solve the problem which is solved by the present invention, namely, of creating a short, light weight and nevertheless noiselessly running piston.

The ring inserts in the piston head according to the invention differ from similar inserts described in EP-A 0,210,649 particularly in that, contrary to those described in the prior known state of the art, they are not arranged in the top land area above the annular grooves. Instead they are located radially in the area within the annular grooves. In that way they can directly bear upon the area of the ring straps at which, through restriction of the heat expansion, an operating tolerance as tight as possible would exist in the cold state and would be maintained under the hot operating conditions.

SUMMARY OF THE INVENTION

It is an object of the present invention to reduce markedly the level of operating noise and, in particular, in the start-up and partial load range, for the aforesaid light-weight and low friction pistons having extremely short body lengths.

This object is achieved by means of a piston of the shape and dimensions according to the present invention. The pistons according to two embodiments differ from one another in that the piston according to one embodiment runs in an engine cylinder made of iron and in that the piston according to the other embodiment runs in a cylinder made of light metal, thereby resulting in the varying running tolerances claimed for these pistons.

BRIEF DESCRIPTION OF THE DRAWINGS

Other objects and features of the present invention will become apparent from the following detailed description considered in connection with the accompanying drawing which discloses several embodiments of the present invention. It should be understood, however, that the drawing is designed for the purpose of illustration only and not as a definition of the limits of the invention.

In the drawing wherein similar reference characters denote similar elements throughout the several views:

FIG. 1 shows a longitudinal half section view of a piston according to line I—I of FIG. 2 and in the other half of the view shows the piston in the direction of the arrows I—I of FIG. 2;

FIGS. 5*a* and 5*b* show longitudinal section views through each piston half with a ring insert in the piston head;

FIGS. 6*a* and 6*b* show a section view through the piston head according to arrows VI—VI of FIG. 5;

DETAILED DESCRIPTION OF PREFERRED EMBODIMENTS

Figure 2:
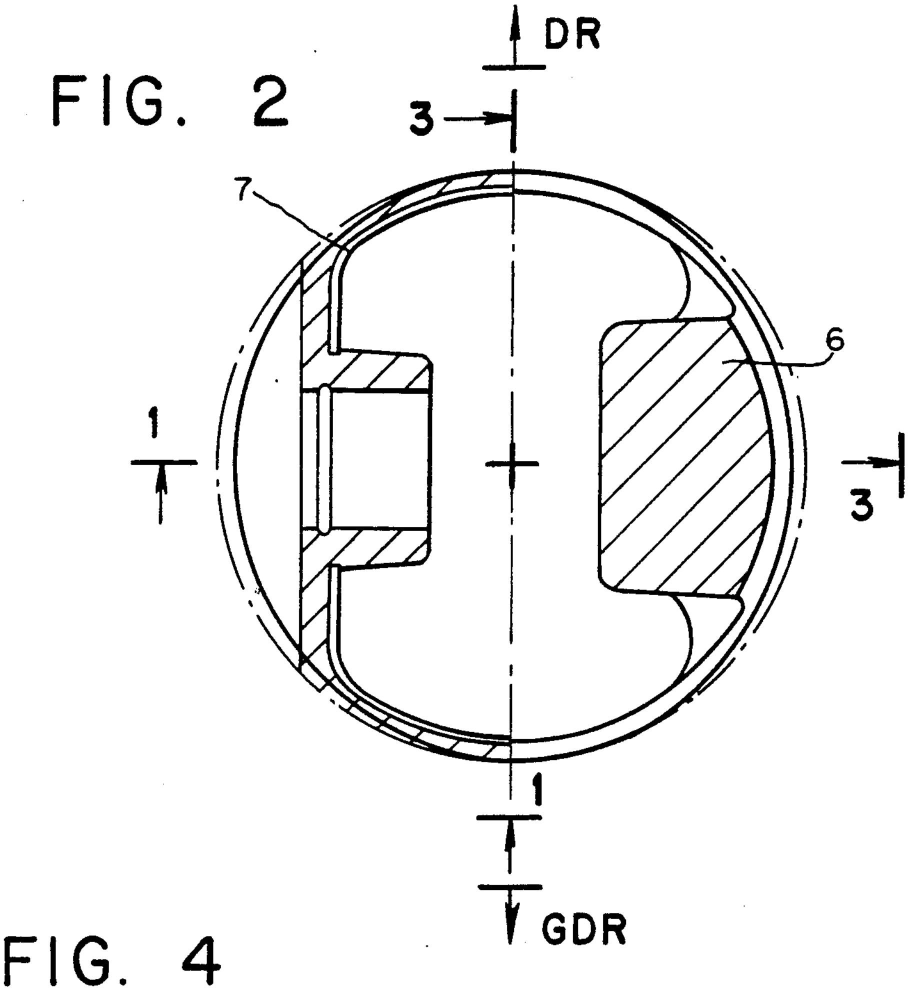
FIG. 2 shows a section view of the piston according to the line II—II of FIG. 1.

Turning now in detail to the drawings, the piston is made of a light metal, and preferably the piston is made of an aluminum silicon alloy. In its headpiece annular grooves 2 and 3 have been provided as compression rings as has an annular groove 4 beneath to receive an oil scrapper ring.

The piston dimensions inscribed in the drawing, in particular in FIG. 4, and essential to the invention are defined, as follows:

L=(0.45-0.65) D
H=(0.25-0.4) D
A=(0.3-0.4) D
A is greater than or equal to B
T=(0.45-0.8) D
C is greater than or equal to 0.1 A
E is greater than or equal to 0.1 A
F is greater than or equal to 0.25 A but is smaller than or equal to 0.75 A where L=maximum body height beneath the lowermost annular groove in a peripheral area having approximately the same body height of at least 45 degrees on each of both bearing sides of the piston (peripheral area between the piston hubs (6);

B=maximum body height outside the body areas with height A;

T=diametrically opposite distance of the radial, external hub bore ends;

C=axial height area at the upper body end of the body area having the height A, which body area is retracted radially in cone-shaped manner at least in a body area lying in pressure-counterpressure direction (P-CPD) to form a hydrodynamic lubricating film wedge;

E=axial height area at the lower body end in the body area having the height A, which body area is retracted radially in cone-shaped manner at least in a body area lying in pressure counter-pressure direction (P-CPD) to form a hydrodynamic lubricating film wedge; and F=axial heigh of an area in the body area having the height A lying at least in pressure-counterpressure direction (P-CPD) between the body areas defined by heights C and E.

The annular strips between the piston ring grooves 2, 3, 4 and the body area F, for the piston under hot running conditions, further exhibit the approximate same running tolerance vis-v-vis the cylinder track.

In the interior of the body 5, steel strips have been formed as expansion-regulating inserts 7 in the peripheral direction between the hubs 6. The body 5 is separated by radial transversal slits 8 in the area between the hubs 6 from the piston head.

Up to the top land area, an ovality has been superimposed on the basic shape of the piston, the large axis of which ovality lies in the pressure-counterpressure direction (P-CPD in FIG. 2) and whose small axis lies in the pin direction.

Figure 4:
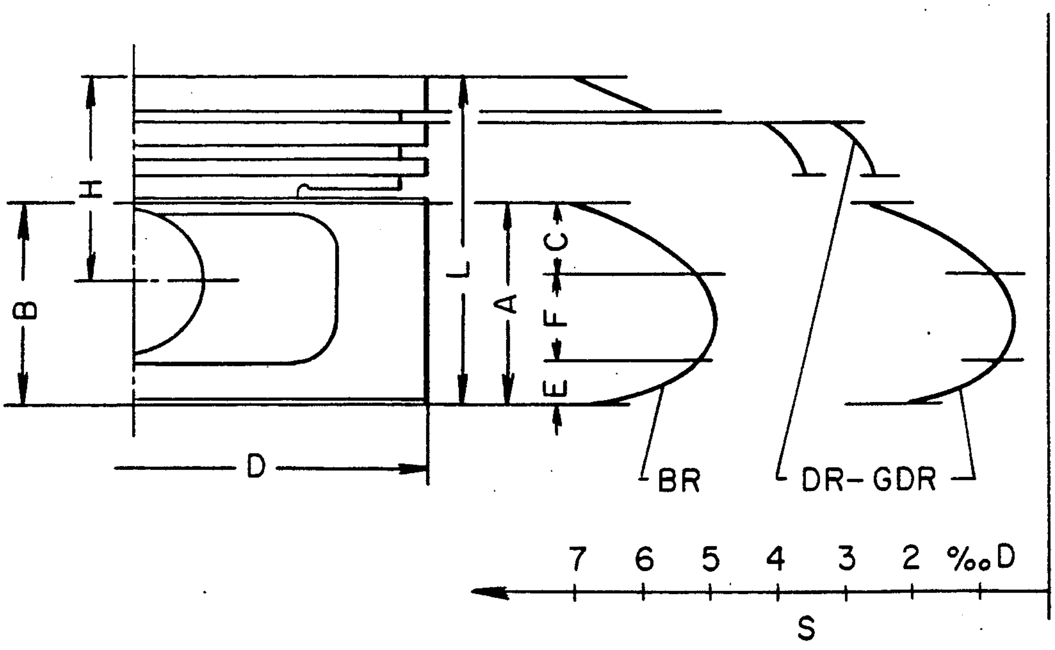
FIG. 4 shows the cold tolerance S between the external shape of the piston and cylinder bearing surface in the pressure-counterpressure direction P-CPD and in the pin direction PD.

The exact progression of the piston surface is reproduced in FIG. 4. The piston contour inscribed in this figure, with the area indications indicated thereto A=30 mm, C=10.5 mm, E=6.5 mm, F=13 mm, H=30 mm and L=49 mm, has been drawn to scale. Diameter D=86 mm and T=63 mm. In this case the values relate to a particularly expedient embodiment of the piston shown in FIGS. 1-3 intended for use in a cast iron cylinder. With reference to the invention, the piston external shape in the pressure-counterpressure direction (P-CPD) is of particular importance, to which shape the running tolerances indicated in the claims directly pertain.

With a warmed up engine, the piston slides simultaneously in the area F as well as on the first and second annular strip on the cylinder track, that is, the piston receives its guiding in these areas. This piston guiding which occurs in two axially separated areas is of extreme importance for a noiseless piston movement. For in order to achieve a noiseless movement, the piston must be guided in an axially sufficient high area in such a way that a piston impact noise or slap triggered by the connecting rod steering can be avoided to the largest possible extent. With flat pistons having correspondingly low body heights, this requirement generally constitutes an unsolvable problem. In this connection the invention provides a solution to this problem in that the annular strips are also utilized in guiding the piston. This is accomplished by interpreting the cold tolerance there in contrast to the hitherto known state of the art in such a way that the hot tolerance there corresponds approximately to that hot tolerance in the area F.

To further promote the noiseless piston movement, the body areas lying above and beneath the piston movement area F are retracted conically to the degree inscribed in FIG. 4 in order to effect a hydrodynamic rise of the piston body in these areas.

In FIG. 4 the external shape in the pressure-counterpressure direction and in the pin direction are inscribed respectively. The intervening areas of the external shape of the piston merge continuously with the dimensions of both those main directions respectively.

A further improvement is achieved by placing a lamellar insert in the form either of a closed steel ring 9 or a pair of a ring section insert 10 into the piston head in the area radially behind the annular grooves 2, 3 4. When the pair of ring section-like inserts 10 is used, a part of this pair is arranged incoming into the hubs in the piston bearing sides between the hubs.

By virtue of these inserts in closed or segmented form, expansion in the area of the piston ring strips is considerably diminished when the piston heats up. The insert or inserts 9, 10 are restricted essentially to the area below the top land section. In the direction of the end of the body the inserts 9, 10 can protrude from the piston base material, respectively. This is expedient because in this way the inserts can be fixed relatively easily in the casting form used to fabricate the piston.

Figure 7:
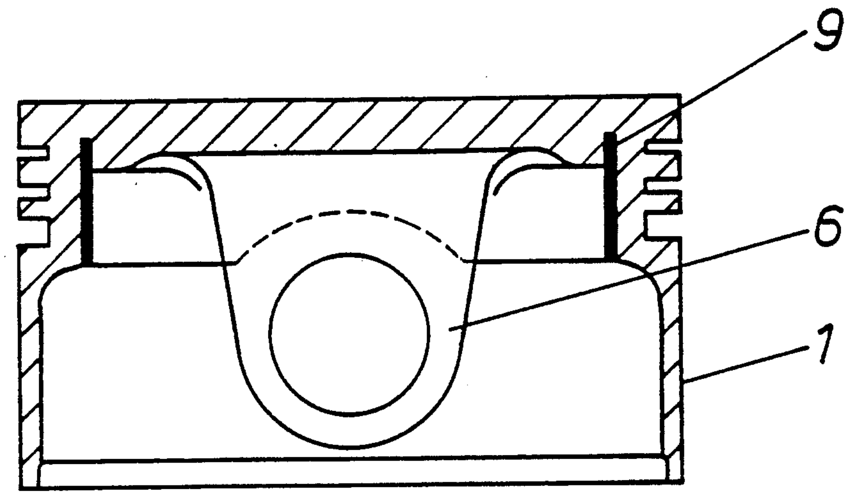
FIG. 7 shows a longitudinal section view through an additional embodiment of a piston with a ring insert in the piston head in the area radially inside the piston ring grooves.

In FIGS. 5-7 various embodiments are shown for the position of a closed ring 9 placed in the headpiece of the piston in which the ring 9 is more or less radially exposed inside. FIG. 6 shows a different embodiment of the ring 9 in the area of the hubs 6 of the piston. In the alternate embodiment according to FIG. *6a*, the ring 9 runs inside the hubs 6 in the vicinity of the external perimeter, while in FIG. *6b* the ring 9 passes rectilinearly like a chord through the hub area in an area lying radially further inside.

In the embodiment according to FIG. 8, instead of a closed ring 9, annular segments 10 have been respectively placed in the piston head areas lying between the hubs 6, whereby these annular segments 10 extend respectively into the hubs 6. The annular segments 10 are also connected integrally with body inserts 7.

Figures 8A, 8B:
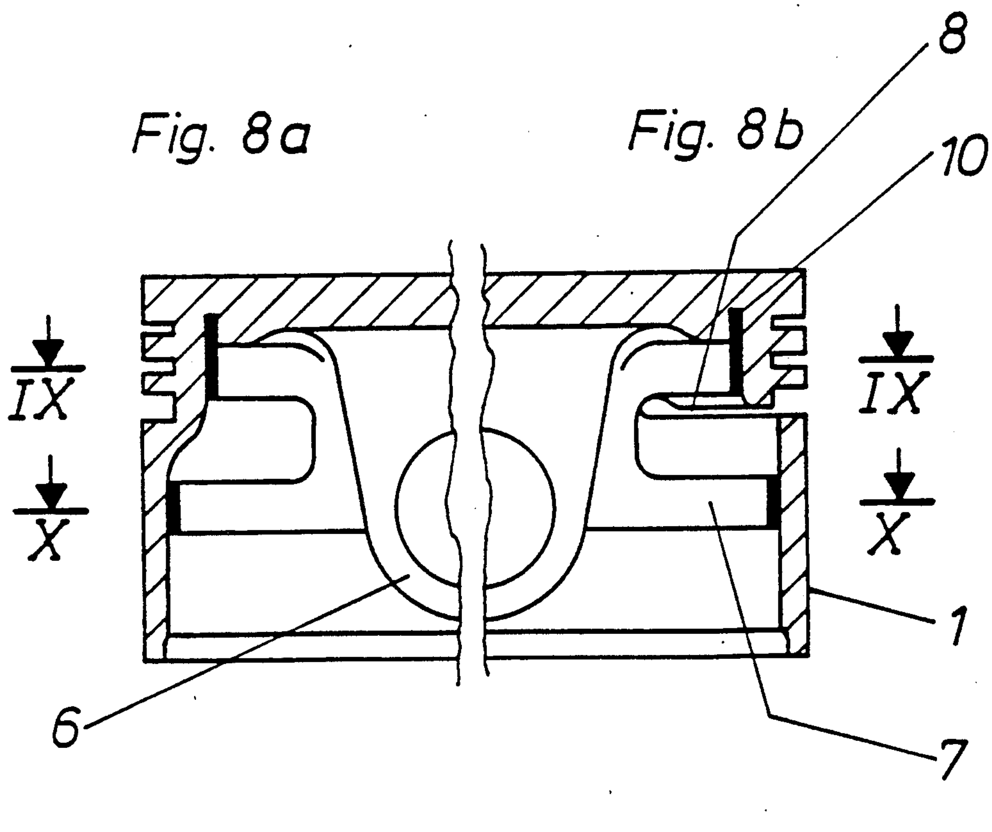
FIGS. 8*a* and 8*b* show a longitudinal section view through two further piston embodiments with a peripherally divided ring insert in the piston head and peripherally also divided expansion-adjusting insert in the shaft, whereby both inserts are respectively interconnected in one piece.
Figure 9:
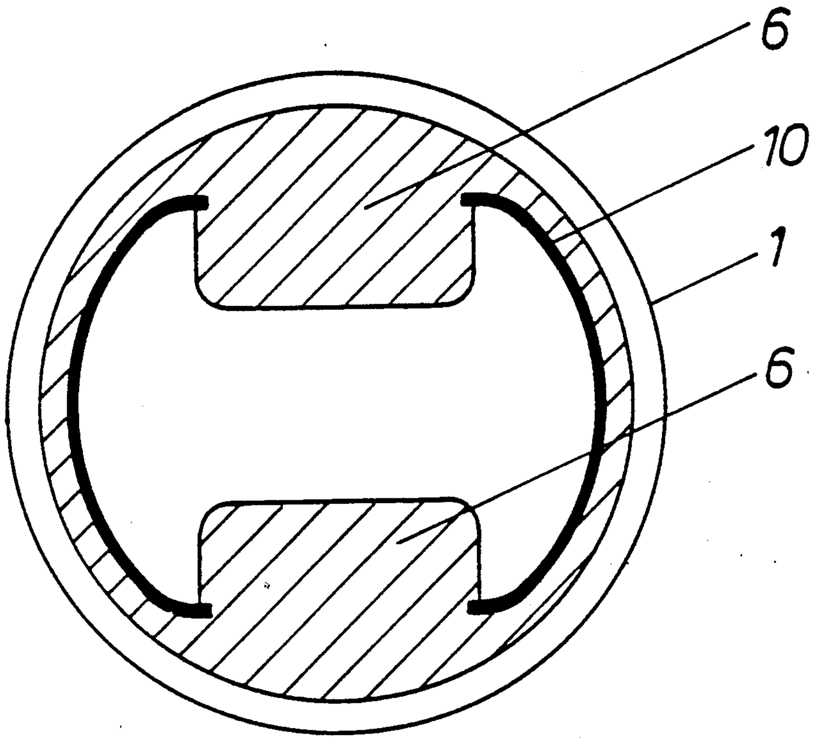
FIG. 9 shows a section view through the piston head according to line IX—IX of FIG. 8.
Figure 10:
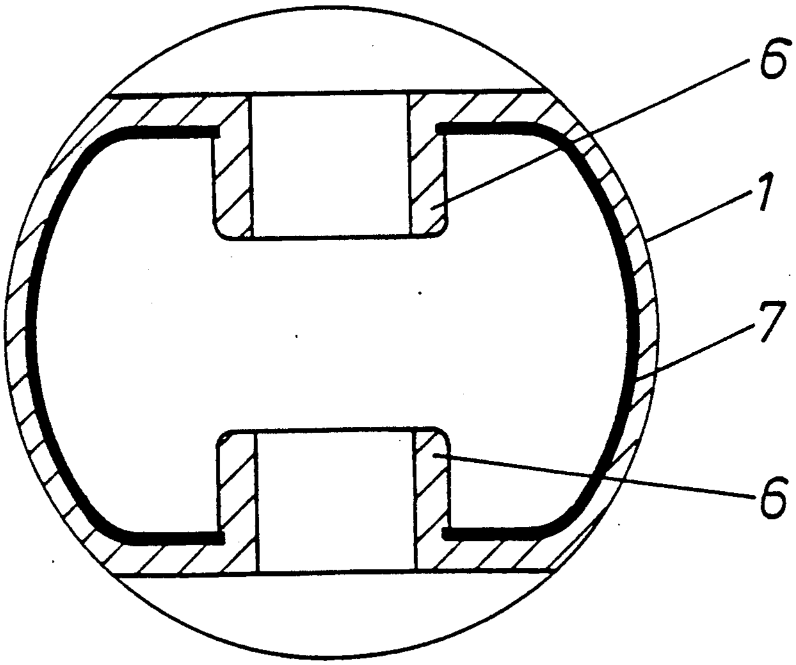
FIG. 10 shows a section through the piston shaft according to line X—X of FIG. 8.

The only difference between the embodiments according to FIGS. 8*a* and 8*b* is that with the piston according to FIG. 8*b*, the head and the body of the piston are separated from each other by a radial transversal slit 8.

The thermal expansion-inhibiting effect of the inserts 9, 10 is essentially based on the fact that during the manufacture of the piston, for example when it is cast, the basic material of the piston radially abutting the inserts on their outside will shrink onto these inserts as the piston material is cooling. When the piston material is reheated, the shrinkage stress has to be relieved first before any expansion can actually take place.

A spacing of the inserts 9, 10 from the bottom surface of the piston is required in order to permit the heat to flow from the bottom of the piston to the piston rings.

The radial slot between the head and the body of the piston is desirable for low body clearance or play values.

The ring 9 shown in FIG. 7, which ring extends relatively far in the direction of the body of the piston, also exerts at the same time a controlling effect on the body.

With inserts 9, 10 corresponding to the embodiments in FIGS. 5–10, a cold tolerance of 1.5 pars pro mille can be achieved in the piston head at the lower annular strip (beneath the annular groove 3). At the upper annular strip (between annular groove 1 and 2) another such cold tolerance of 2.2 pars pro mille, can be achieved in each case relative to the diameter of the piston. The top land of the piston head is not utilized in each instance to guide the piston.

While only a few embodiments of the present invention has been shown and described, it is to be understood that many changes and modifications may be made thereunto without departing from the spirit and scope of the invention as defined in the appended claims.

We claim:

1. A single, light-weight, low friction, light-metal piston for use in a cylinder having a contact bearing surface of an internal combustion engine, comprising:

said piston having hub bores and piston ring grooves being arranged exclusively above the hub bores wherein (a) H=(0.25–0.4) D;

(b) A is equal to or greater than B;

(c) T=(0.45–0.8) D;

(d) L=(0.45–0.65) D;

(e) A=(0.3–0.4) D;

(f) C is equal to or greater than 0.1 A;

(g) E is equal to or greater than 0.1 A;

(h) F is equal to or greater than 0.25 A, but lesser than 0.75 A;

(i) said piston having piston outer surfaces on a piston body in direct operational contact with the contact surface of the cylinder of the internal combustion engine or in indirect operational contact therewith via the lubricating film, said piston outer surfaces lie on a cylindrical surface equipped with an oval-shaped overlay, whereby the larger oval-shaped axis in pressure-counterpressure direction (P-CPD) and the small oval-shaped axis extend in the pin direction;

(j) said piston having pin hubs and expansion adjusting lamellar metal inserts, the cold tolerance in a cylinder material made of iron forming the opposing contact surface lies in the part of the bearing area adjacent to the pressure-counterpressure direction at values between approximately (0.0001–0.0006) D when said expansion-adjusting, lamellar metal inserts engage inside surfaces of the piston body lying between the pin hubs, which inserts prevent piston body expansion in the pressure-counterpressure direction in the piston which is warming up, or between approximately (0.0004–0.0001) D, when such expansion inserts are not present;

(k) said piston ring grooves having annular strips between said grooves, the running tolerances at the annular strips between said piston ring grooves and in the piston area F with the smallest running tolerance opposite the cylinder bearing surface, for the piston under hot running conditions, deviate a maximum of five-fold from each other, in order to provide the piston a synchronous guiding at the annular strips and in the area F of the piston;

wherein

L=maximum piston length;

D=maximum piston diameter;

H=compression height;

A=median piston body height beneath the lowest piston ring groove in a peripheral area having the approximate same piston body height of at least 45 degrees on each of both bearing sides of the piston, said bearing sides being the peripheral area between the piston hubs;

B=maximum piston body height outside the piston body areas with height A;

T=diametrically opposite distance of the radial, external hub bore ends;

C=axial height area at the upper piston body end in the piston body area having the height A, which piston body area is retracted radially and in a cone-shaped manner, at least in a piston body area lying in pressure-counterpressure direction (P-CPD), to form a hydrodynamic lubricating film wedge;

E=axial height area at the lower piston body end in the piston body area having the height A, which piston body area is retracted radially and in a cone-shaped manner, at least in a piston body area lying in pressure-counterpressure direction (P-CPD), to form a hydrodynamic lubricating film wedge; and F=axial height of an area in the piston body area having the height A lying, at least in pressure-counterpressure (P-CPD) direction, between the piston body areas defined by heights C and E.

2. Piston according to claim 1, wherein (a) L=(0.5–0.6) D;

(b) H=(0.25–0.36) D; and (c) A=(0.32–0.38) D.

3. Piston according to claim 1, wherein (a) C is equal to or greater than 0.12 A; and (b) E is equal to or greater than 0.12 A.

4. Piston according to claim 1, wherein (a) C is equal to or greater than 0.15 A;

(b) E is equal to or greater than 0.15 A; and (c) F is equal to or greater than 0.25 A, but equal to or lesser than 0.65 A.

5. Piston according to claim 1, wherein (a) C is equal to or greater than 0.18 A;

(b) E is equal to or greater than 0.18 A; and (c) F is equal to or greater than 0.25, but equal to or lesser than 0.6 A.

6. Piston according to claim 1, wherein the running tolerances at the annular strips between the piston ring grooves and in the piston body area with the lowest running tolerance opposite the cylinder bearing surface, for the piston under hot running conditions, deviate a maximum of four-fold from each other.

7. Piston according to claim 6, wherein
the running tolerances deviate a maximum of three-fold from each other.

8. Piston according to claim 1, wherein
the body of the piston at the lower end exhibits a closed cylindrical external shape whose cold tolerance varies axially and peripherally, but which, however, at no location exceeds a value of approximately 0.01 D.

9. Piston according to claim 1, wherein
the piston body beneath the lowermost piston ring groove is radially split at its peripheral areas lying between the pin hubs.

10. Piston according to claim 1, wherein
the piston is equipped with two compression rings and a scrapper ring; and
said rings being received within said piston ring grooves.

11. Piston according to claim 1, wherein
in the area of the piston lying radially behind the piston ring grooves between the hubs, strip-shaped inserts made of a material having a lower heat expansion coefficient vis-a-vis the base material of the piston have been placed in a peripheral direction.

12. Piston according to claim 11, wherein
the strip-shaped inserts are a closed ring.

13. Piston according to claim 11, wherein
the inserts are at a distance from the piston surface.

14. A single light-weight, low friction, light-metal piston for use in a cylinder having a bearing contact surface of an internal combustion engine, comprising:
said piston having hub bores and piston ring grooves being arranged exclusively above the hub bores, wherein
(a) H=(0.25–0.4) D;
(b) A is equal to or greater than B;
(c) T=(0.45–0.65) D;
(d) L=(0.45–0.65) D;
(e) A=(0.3–0.4) D;
(f) C is equal to or greater than 0.1 A;
(g) E is equal to or greater than 0.1 A;
(h) F is equal to or greater than 0.25 A, but lesser than 0.75 A;
(i) said piston having piston outer surfaces in a piston body in direct operational contact with the bearing surface of the cylinder of the internal combustion engine or in indirect operational contact therewith via the lubricating film;
said piston outer surfaces lie on a cylindrical surface equipped with an oval-shaped overlay, whereby the larger oval-shaped axis extends in the pressure-counterpressure direction (P-CPD), and the small oval-shaped axis extends in the pin direction;
(j) said piston having pin hubs and expansion adjusting lamellar metal inserts, the cold tolerance in a cylinder material made of iron forming the opposing contact surface lies in the part of the bearing area adjacent to the pressure-counterpressure direction at values between approximately (0–0.0004) D when said expansion-adjusting, lamellar metal inserts engage inside surfaces of the piston body lying between the pin hubs, which inserts prevent piston body expansion in the pressure-counterpressure direction in the piston which is warming up, or between (0.0001–0.0005) D, when such expansion inserts are not present;
(k) said piston ring grooves having annular strips between said grooves, the running tolerances at the annular strips between piston ring grooves and in the piston area F, with the smallest running tolerance opposite the cylinder bearing surface for the piston under hot running conditions, deviate a maximum of five-fold from each other, in order to provide the piston a synchronous guiding at the annular strips and in the area F of the piston;
wherein
L=maximum piston length
D=maximum piston diameter;
H=compression height;
A=median piston body height beneath the lowest piston ring groove in a peripheral area having the approximate same piston body height of at least 45 degrees on each of both bearing sides of the piston, said bearing sides being the peripheral area between the piston hubs;
B=maximum piston body height outside the piston body areas with height A;
T=diametrically opposite distance of the radial, external hub bore ends;
C=axial height area at the upper piston body end in the piston body area having the height A, which piston body area is retracted radially and in a cone-shaped manner, at least in a piston body area lying in pressure-counterpressure direction (P-CPD), to form a hydrodynamic lubricating film wedge;
E=axial height area at the lower piston body end in the piston body area having the height A, which piston body area is retracted radially and in a cone-shaped manner, at least in a piston body area lying in pressure-counterpressure direction (P-CPD), to form a hydrodynamic lubricating film wedge; and
F=axial height of an area in the piston body area having the height A lying, at least in pressure-counterpressure (P-CPD) direction, between the piston body areas defined by heights C and E.

15. Piston according to claim 14, wherein
the running tolerances deviate a maximum of three-fold from each other.

16. Piston according to claim 14, wherein
the body of the piston at the lower end exhibits a closed cylindrical external shape whose cold tolerance varies axially and peripherally, but which, however, at no location exceeds a value of approximately 0.01 D.

17. Piston according to claim 14, wherein
the piston body beneath the lowermost piston ring groove is radially split at its peripheral areas lying between the pin hubs.

18. Piston according to claim 14, wherein
the piston is equipped with two compression rings and an oil scrapper ring; and
said rings being received within said piston ring grooves.

19. Piston according to claim 14, wherein
in the area of the piston lying radially behind the piston ring grooves between the hubs, strip-shaped inserts made of a material having a lower heat expansion coefficient vis-a-vis the base material of the piston have been placed in a peripheral direction.

20. Piston according to claim 19, wherein the strip-shaped inserts are a closed ring.

21. Piston according to claim 20, wherein
the inserts are at a distance from the piston surface.

* * * * *

UNITED STATES PATENT AND TRADEMARK OFFICE

CERTIFICATE OF CORRECTION

PATENT NO. : 5,048,398

DATED : September 17, 1991

INVENTOR(S) : Horst PFEIFFENBERGER, Emil RIPBERGER and Jurgen ELLERMAN

Figure 3:
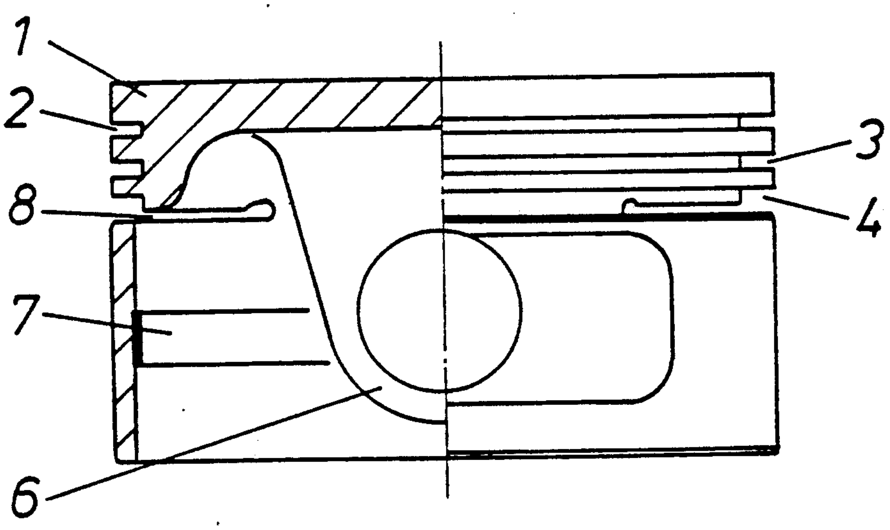
FIG. 3 shows a longitudinal half section view of a piston according to line III—III of FIG. 2 and in the other half of the view shows the piston in the direction of the arrows III—III of FIG. 2.

It is certified that error appears in the above-identified patent and that said Letters Patent is hereby corrected as shown below:

Please cancel FIG. 2 on Sheet 1 of the drawings.

Signed and Sealed this

Thirteenth Day of April, 1993

*Attest:*

STEPHEN G. KUNIN

*Attesting Officer*

*Acting Commissioner of Patents and Trademarks*